Figure 1:
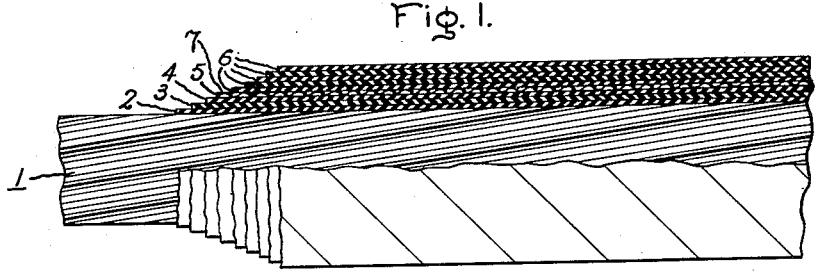

July 9, 1957   E. L. CRANDALL   2,798,899
INSULATED ELECTRIC CABLE AND METHOD OF MAKING SAME
Filed April 20, 1953

.005" PAPER.

.020" COATING OF UN-VULCANIZED BUTYL.

.020" COATING OF UN-VULCANIZED BUTYL.

.010" FABRIC.

FRICTION COAT OF NEOPRENE.

Inventor:
Eugene L. Crandall,
by  *Otto H. Knoop*
His Attorney.

United States Patent Office 2,798,899
Patented July 9, 1957

2,798,899

INSULATED ELECTRIC CABLE AND METHOD OF MAKING SAME

Eugene L. Crandall, Schenectady, N. Y., assignor to General Electric Company, a corporation of New York Application April 20, 1953, Serial No. 349,811

3 Claims. (Cl. 174—121)

The present invention relates to insulated electric cable. The invention is particularly concerned with single conductor electric cable intended for applications where flexibility is important and wherein the cable must be capable of withstanding rough usage, high heat, and oily surroundings, such properties being of especial importance in cable used, for instance, for general-purpose power wiring in diesel-electric locomotives.

In the past, cables intended for applications of the character referred to in the preceding paragraph have not proven entirely satisfactory for various reasons. One source of trouble which has been experienced with cables having an outer braid covering resulted from a cracking of the braid and insulation when such cables were disconnected for repairs to other equipment. This was probably due in part to embrittlement caused by painting over of the cable braid. Another source of trouble has been traced to seepage of liquids such as water and oil through the jacket into the cable in some manner.

It is an object of this invention to eliminate these aforedescribed inadequacies among others and to furnish new advantages by providing an improved flexible electric cable well adapted to withstand rough usage, abrasion, and adverse environments such as high ambient temperatures, acids, alkalies, sunlight, water, flame, and oil.

It is a further object of this invention to provide an electric cable having the above properties which can be manufactured at low cost, which has good electrical characteristics, and which has a smaller overall diameter than comparable cables presently available for the purposes described, so as to meet the requirements of installation in limited space, for instance within the limited space available in a locomotive.

The foregoing objects, and others, are accomplished in accordance with my invention by providing a flexible conductor with a covering initially formed of superimposed windings of specially prepared tapes. Specifically, starting from the conductor and working out, there is applied to the conductor a first tape comprising a supporting element such as paper which has been coated on one side with unvulcanized butyl rubber, also known as GR-I (Government Rubber-Isobutylene, which is a copolymer produced by copolymerizing isobutylene and just enough isoprene, or in some cases butadiene, to permit vulcanization, for instance about 98 parts of isobutylene and 2 parts of isoprene), or some other synthetic rubber similar to butyl, the paper surface being against the conductor. Over the first tape there is applied a second tape comprising a supporting and reinforcing element, preferably a fabric coated on one side with butyl rubber and on the other with neoprene (which is a polymer of 2-chlorobutadiene or chloroprene), the butyl surface being in direct contact with the butyl surface of the first tape. The second tape is covered with a plurality of layers of unvulcanized, unsupported (no paper or fabric backing) neoprene tape. The entire cable is then subjected to conventional vulcanizing conditions for both the butyl rubber and the neoprene, whereby the tape layers are converted into an integral body of insulation covering the conductor.

Figure 2:
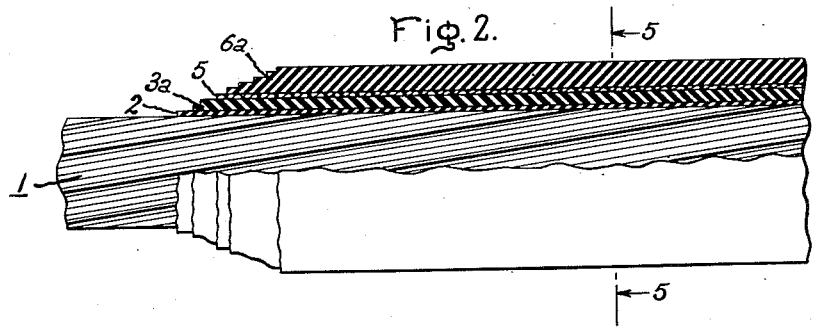
Figure 3:
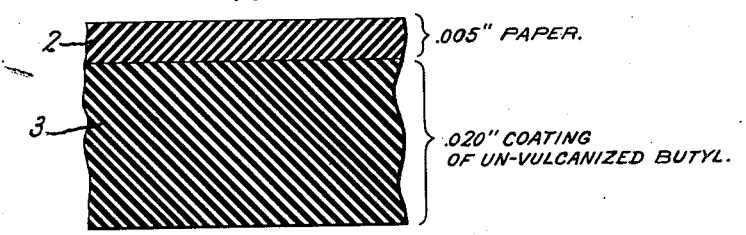
Figure 4:
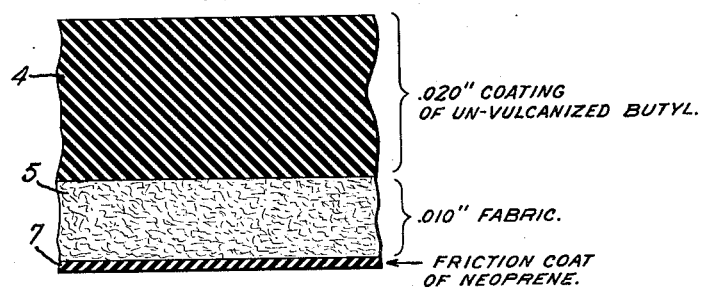

For a better and more complete understanding of the invention, reference should be had to the following specification and the accompanying drawings, in which Figure 1 is an elevation, partially in section, of a length of uncompleted, insulated cable constructed according to the invention but before vulcanization; portions of the insulation being cut away to show the construction; Figure 2 is a similar view of the same length of cable after it has been completed by vulcanization; Figures 3 and 4 are greatly enlarged sectional views of the first and second combination tapes respectively; and Figure 5 is a cross sectional view of the completed cable of Figure 2.

Referring more particularly to the drawings in Figure 1, element 1 indicates a single, rope stranded, flexible electrical conductor formed of a large number of individual strands; 2 indicates a paper tape having a butyl rubber coating 3 (see enlarged sectional view in Fig. 3); 5 indicates a fabric tape having a butyl rubber coating 4 on one surface, and having a neoprene friction coating 7 on its other surface (see enlarged sectional view in Fig. 4); and 6 indicates the several final unvulcanized neoprene tapes, four having been illustrated in the present instance, although fewer or more neoprene tape layers may be applied.

Figure 5:
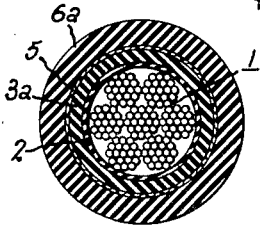

Figures 2 and 5 illustrate longitudinal and transverse sections, respectively, through the completed cable which is obtained after the tape-wound conductor has been vulcanized. As illustrated, the two contiguous butyl rubber surfaces of Figure 1 have been fused into a single, substantially homogeneous butyl rubber layer 3a, and the neoprene surface of fabric tape 5 of Figure 1 together with the four final contiguous neoprene tapes 6 of Figure 1 have been fused into a single, substantially homogeneous neoprene layer 6a.

In carrying my invention into effect, I take a flexible electrical conducting element which may be, for instance, a flexible copper conductor comprising a plurality of stranded elements, rope stranded together, forming, for example, a size 3/0 (450/24 AWG) conductor. I wind thereover in one direction a prefabricated first tape comprising paper coated on one surface with unvulcanized synthetic rubber, for instance, butyl rubber, the paper surface of the tape being against the surface of the conductor. It is preferably wound with a closed butt joint. It may comprise, for example, a ¾ inch wide manila paper tape having a thickness of the order of 0.005 inch and being coated on one surface with unvulcanized butyl rubber of a thickness of the order of 0.020 inch. The paper surface of this first tape performs two important functions, serving in the first instance as a physical carrier for the thin gauge physically weak unvulcanized butyl, and in the second providing a low cost, easy stripping separator directly against the conductor for ease in splicing, making new connections, etc.

Directly over the firstly described tape I wind, preferably in the same direction, a second prefabricated tape comprising a fabric material coated on one surface with a desired thickness of unvulcanized butyl rubber and thinly coated on the other surface with unvulcanized neoprene, the unvulcanized butyl rubber surface being wound in direct contact with the unvulcanized butyl rubber surface of the first tape. This second tape is also preferably wound with a closed butt joint with its joint positioned midway between adjacent joints between the laps of the underlying first tape. By way of example, the second tape may comprise a woven cotton fabric tape ¾ inch wide, having a thickness of the order of 0.010 inch, and being coated on one surface with unvulcanized butyl rubber of a thickness of the order of 0.020 inch and being coated on the other surface with unvulcanized neoprene.

The neoprene coating on this second tape is relatively thin and is a coating of the type known to the art as a "friction coating."

This second prefabricated tape serves a triple purpose. First, the fabric forms a physical carrier for the thin, physically weak coating of unvulcanized butyl while it is being wound on the cable; second, the fabric acts as a reinforcing member for the finished cable; and third, after vulcanization, the fabric acts as a bond between the butyl insulation and the neoprene jacket so that they do not separate. Further, if oil (such as is always present on diesel-electric locomotives) should contact the cable conductor at the terminals, the fabric reinforcement will aid in preventing the butyl rubber from swelling.

Over the first and second tapes, I then wind a plurality of layers of unsupported unvulcanized neoprene tapes, which will form the cable jacket. These last mentioned tapes may be, for instance, 1½ inches wide and 0.017 inch thick, and may be wound with interlocked, closed butt joints, some layers being wound in one direction and others in an opposite direction. For example, in the case of four layers of such tapes, I may wind the first two layers in one direction and the last two in the opposite direction. More specifically, in the case of four neoprene tape layers, I may wind the first two layers in a direction opposite to the winding of the first tape (i. e. the tape closest to the conductor) and the last two layers in the opposite direction, namely in the same direction as the tape closest to the conductor. Each of these successive tape layers is wound preferably with its joint midway between adjacent joints of the underlying tape. Preferably, the neoprene tapes are wound under considerable tension; for example, in the case of neoprene tapes having 0.017 inch initial thickness, the tension may be sufficient to reduce the thickness to 0.015 inch.

After the several tapes have been applied, the entire covering is vulcanized by any suitable method. For example, the cable may be vulcanized in a lead sheath, which is subsequently removed this being a well known method.

Inspection of a section of the cable cut after the vulcanization, as illustrated in Figures 2 and 5, brings to light important features and advantages of my invention. As illustrated, the completed cable comprises a paper layer over the conductor, followed by an integral, substantially homogeneous layer of butyl rubber, then a layer of fabric, and finally, an integral, substantially homogeneous, outer jacket of neoprene. Since the two butyl rubber surfaces of the first two tapes were applied in direct contact with each other, vulcanizing causes these two contiguous butyl rubber surfaces to unite or fuse to form effectively a single, integral layer of butyl rubber. This integral butyl rubber layer has excellent electrical insulating properties. It can be easily stripped from the conductor by reason of the underlying paper layer, which is not bonded to the conductor and can be separated from the conductor with ease. Similarly, the neoprene surface of the fabric tape becomes, upon vulcanizing, united or fused with the outer unsupported neoprene tape layers which also become united or fused with each other so as to result, in effect, in a single thickness of neoprene separated from the underlying butyl rubber insulation by the fabric but, nevertheless, being securely bonded to the butyl rubber by the same fabric layer.

It may be noted at this point that the butyl rubber, being a relatively soft material when unvulcanized, readily bonds itself during vulcanization to the fibers of the fabric although the butyl was applied to the fabric by simple calender coating. Neoprene, on the other hand, does not so readily do this, but will do so where, as described, a thin layer was friction calendered to the fabric. Thus in the finished cable both the butyl and the neoprene are intimately bonded to the fibers of the fabric layer.

Other advantages of my invention lie in the fact that it overcomes the undesirable properties of both butyl rubber and neoprene were either to be used alone for the instant purpose, while at the same time the desirable properties of both are effectively utilized to produce a cable with a combination of features not heretofore commercially available.

Butyl rubber, like similar synthetic rubbers, when the material is compounded correctly and vulcanized, has very good electrical and physical properties, and its ability to withsand relatively high operating temperatures without serious loss of these properties is excellent. However, contact with oil will cause serious softening and swelling of butyl rubber; and before vulcanization, the physical properties of butyl rubber are very poor.

Neoprene, on the other hand, has good heat resistance, flame resistance, oil resistance, and presents economic advantages. However, neoprene is very poor electrically, particularly when used in D. C. circuits, having low insulation resistance, and it also is subject to electro-endosmosis effects. The combined properties of the butyl rubber insulation over the conductor and of the overall neoprene jacket, the two being reinforced and bonded together as described, provides an excellent cable and fulfills the objects of this invention.

It should also be noted that there is an important advantage in the described tape method of construction, since it makes possible the manufacture at a reasonable cost of a cable of small overall diameter, having thin, concentric walls of insulation and jacket, and having improved strength and flexibility and with a firm bond between the basic insulation and jacket. However, it will be recognized by those skilled in the art that these advantages can partially be obtained by extruding the neoprene jacket over the friction coating of neoprene on the fabric tape, instead of winding unsupported neoprene tapes. Extruded jackets, however, may not be exactly concentric with the conductor, so that a greater jacket thickness is likely to be required, thereby not only increasing the cost, but also undesirably increasing the overall cable diameter.

Although my invention has been primarily described in connection with butyl rubber and neoprene, it is not limited thereto since other suitable materials, although less preferred, are contemplated. With respect to the paper used for the first tape, this invention is not limited to the described manila paper as other papers of the same approximate width and thickness, such as crepe, kraft, etc., may be used. Similarly, any of various suitable materials may be used for the supporting member in the combination butyl rubber-neoprene tape, for instance, yarns or fabrics, woven or unwoven, of cotton, silk, glass, or the like.

What I claim as new and desire to secure by Letters Patent of the United States is:

1. An electric cable comprising a flexible conductor, a layer of tape comprising paper coated on one surface with butyl rubber spirally arranged over the conductor surface with the paper surface in contact with the conductor, a second tape comprising fabric coated on one surface with butyl rubber and on the other surface with neoprene spirally arranged over the first tape with the butyl surface in contact with the butyl surface of the first tape, and a plurality of tapes comprising neoprene covering said second tape, the vulcanizable materials of the tapes being vulcanized to provide an integral structure.

2. An electric cable comprising a flexible conductor, a layer of tape comprising paper coated on one surface with butyl rubber spirally arranged over the conductor surface with the paper surface in contact with the conductor, a second tape comprising a supporting material coated on one surface with butyl rubber and on the other surface with neoprene spirally arranged over the first tape with the butyl surface in contact with the butyl surface of the first tape, and a plurality of tapes comprising neoprene covering said second tape, the vulcanizable materials of the several tapes being vulcanized to provide an integral insulating structure of small diameter.

3. An electric cable comprising a flexible conductor, a layer of tape comprising paper coated on one side with butyl rubber of a thickness of the order of 0.020 inch spirally arranged over the conductor with the paper side in contact with the conductor, a second tape comprising fabric coated on one side with butyl rubber of a thickness of the order of 0.020 inch and friction coated on the other side with neoprene spirally arranged over the first tape with the butyl side in contact with the butyl side of the first tape, and a plurality of tapes comprising neoprene covering said second tape, the vulcanizable material of the tapes being vulcanized to provide an integral structure.

References Cited in the file of this patent

UNITED STATES PATENTS

| | | |
|---|---|---|
| 538,020 | Habirshaw | Apr. 23, 1895 |
| 2,098,149 | Jewell et al. | Nov. 2, 1937 |
| 2,145,350 | Haslam | Jan. 31, 1939 |
| 2,181,632 | Winkelmann | Nov. 28, 1939 |
| 2,226,590 | Smyers | Dec. 31, 1940 |
| 2,427,197 | Cox | Sept. 9, 1947 |
| 2,471,752 | Ingmanson | May 31, 1949 |
| 2,502,353 | Sullivan | Mar. 28, 1950 |
| 2,580,050 | Sparks | Dec. 25, 1951 |